United States Patent
Wiemann et al.

(10) Patent No.: US 8,538,437 B2
(45) Date of Patent: Sep. 17, 2013

(54) METHOD AND DEVICES FOR DUPLICATED PACKETS IDENTIFICATION DURING HANDOVER

(75) Inventors: Henning Wiemann, Aachen (DE); Joachim Sachs, Aachen (DE); Ian Herwono, Stowmarket (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 885 days.

(21) Appl. No.: 11/569,107

(22) PCT Filed: May 14, 2004

(86) PCT No.: PCT/EP2004/005192
§ 371 (c)(1),
(2), (4) Date: Nov. 14, 2006

(87) PCT Pub. No.: WO2005/115038
PCT Pub. Date: Dec. 1, 2005

(65) Prior Publication Data
US 2008/0095112 A1    Apr. 24, 2008

(51) Int. Cl.
*H04Q 7/20* (2006.01)
(52) U.S. Cl.
USPC ........... 455/439; 455/436; 455/437; 455/440; 455/438; 370/322; 370/493; 370/253; 370/242
(58) Field of Classification Search
USPC ................... 455/436, 439, 442, 443
See application file for complete search history.

(56) References Cited

U.S. PATENT DOCUMENTS

| | | | |
|---|---|---|---|
| 5,940,371 A | 8/1999 | Mitts et al. | |
| 7,197,019 B2 * | 3/2007 | Menzel et al. | 370/331 |
| 7,616,607 B2 * | 11/2009 | Eriksson et al. | 370/331 |
| 2002/0141360 A1 | 10/2002 | Baba et al. | |

FOREIGN PATENT DOCUMENTS

| | | |
|---|---|---|
| EP | 1 370 041 A | 12/2003 |
| JP | H11-313358 A | 11/1999 |
| JP | 2002-237781 A | 8/2002 |
| JP | 2002-271258 A | 9/2002 |
| WO | WO2004/002051 A2 | 12/2003 |

OTHER PUBLICATIONS

Balakrishnan, Hari et al., "Improving Reliable Transport and Handoff Performance in Cellular Wirless Networks", Aug. 2005, pp. 469-481.*

(Continued)

*Primary Examiner* — Olumide T Ajibade Akonai
*Assistant Examiner* — Randy Peaches

(57) ABSTRACT

A method and devices for performing a handover of a data unit based communication that involves a sequence of data units from a first connection (51) between a first sender (10) and a receiver (4) to a second connection (52) between a second sender (20) and said receiver (4), which comprises indicating to the receiver (4) a reference data unit among data units provided to both the first sender (10) and the second sender as a part of the handover, and where the receiver, based on the reference data unit, keeps a record for identifying such data units among those data units provided to both the first sender (10) and the second sender (20) that were sent over the first connection (51) and successfully received by the receiver (4), prior to the communication having been passed to the second communication (52).

10 Claims, 6 Drawing Sheets

(56) References Cited

OTHER PUBLICATIONS

Wolisz, A: "Mombasa" web-site of Telecommunication Networks Group of Technical University of Berlin, Germany, Jul. 2003.
Perkins, C et al: "Optimized smooth handoffs in Mobile IP" Proceedings IEEE International Symposium on Computers and Communications, XX, XX, Jul. 6, 1999, pp. 340-346.
Malki, et al: "Simultaneous Bindings for Mobile IPv6 Fast Handovers" Internet Draft, May 2003.
Perkins, C et al: "IP Mobility Support for IPv4, RFC 3220" Network Working Group, Jan. 2002.
European Patent Office International Search Report issued Mar. 31, 2005 for PCT/EP2004/005192.

* cited by examiner

METHOD AND DEVICES FOR DUPLICATED PACKETS IDENTIFICATION DURING HANDOVER

FIELD OF THE INVENTION

The present invention relates to a method of performing a handover of a data unit based communication from a first connection between a first sender and a receiver to a second connection between a second sender and said receiver, as well as to senders and receivers capable of performing such a handover.

BACKGROUND OF THE INVENTION

The concept of handing over a communication from a first connection to a second connection is well known. There can be many reasons for performing such a handover, e.g. because the first connection deteriorates in quality due to the movement of the receiver, the sender associated with the first connection becomes overloaded, the second connection has became available and has more desirable properties, e.g. provides a higher data rate, etc.

Performing a handover from a first connection to a second connection means that the communication underway is discontinued over the first connection and continued over the second connection. It is possible that the second connection must first be established before performing the handover, and the first connection is itself discontinued after the handover, but this is not necessarily the case, as a handover can also be performed between standing connections whose existence is independent of the handover procedure.

One of the problems involved in handovers is that of data loss. Namely, in the course of transferring a communication from a first connection to a second connection, it is possible that parts of the data being transmitted to the sender are lost, e.g. because the data is queued or processed at the sender of the first connection, and was not completely transmitted at the time that the communication is discontinued over the first connection. In order to solve this problem, it has been suggested to perform so-called multicast handovers, in which prior to discontinuing the communication over the first (or old) connection, the data destined for the receiver is provided to both the sender of the first connection and the sender of the second (or new) connection.

It is noted that a handover scenario can comprise a plurality of second connections, i.e. that there can be several candidates to which the communication may be handed over. If this is the case, then the multicasting handover provides the data to all of the second connections.

As an example, if there are two access routers, each associated with its own access network, for wireless communication with a mobile receiver, where the connections from the access routers to the mobile are link layer connections or links, then the performance of a multicast handover can be implemented by having the first access router (the access of the first link from which the communication is being handed over) duplicate the layer 3 (i.e. above the link layer) data units (e.g. IP packets) that are to be sent to the mobile receiver, and forward these to the second access router (the access router of the second connection to which the communication is being handed over). The second access router queues the multicast data units, and starts sending upon receiving an appropriate enablement signal.

Problem Underlying the Invention

The above-described concept of multicast handover leads to a number of problems. One of these problems is that although multicasting allows to avoid the loss of data during handover, it can on the other hand lead to sending the same data over several connections, which constitutes a waste of network resources and is therefore very inefficient. Another problem is that the reception of duplicated data at the receiver can lead to severe interference with the functionality of data handling at protocol layers above the layer governing the connections in questions. This can e.g. be explained by using the example of link layer connections over which a TCP (Transmission Control Protocol) communication is being handled and for which a handover is performed. From the moment at which multicasting starts, IP packets are duplicated and also sent to the new access router. By the time at which the handover occurs, a potentially large number of IP packets is queued at the new access router, although many may have already been received at the receiver over the old link. These IP packets are now again transmitted after the handover. Apart from the waste of resources for the transmission, these IP packets will be perceived by the TCP receiver as duplicates and will force the TCP receiver to send so-called duplicate acknowledgements (DUPACKs) back to the TCP sender. For every three DUPACKs the TCP sender will reduce its transmission rate by 50%, since it assumes that they are caused by a packet loss due to network congestion. As a consequence, the performance of the TCP communication can be drastically reduced. This is particularly annoying, since it can take a long time before the TCP congestion control algorithm will again reach a high sending rate.

EP 1 370 041 A1 describes a process and apparatus for communication between a mobile node and a communication network. More specifically, a process for conducting a handover within the context of IPv6 is described. It is proposed to introduce a duplication and merging agent within the communication network. Two paths to a mobile node are established, and packets are duplicated for sending over both paths. A merging operation is performed, in order to suppress redundancy. In order to perform the merging operation, the destination option header of duplicated packets carries duplication and merging control information.

"Optimized smooth handoffs in Mobile IP" by C. Perkins and K. Wang, Proceedings IEEE International Symposium on Computers and Communication, July 1999, pages 340-346, XP002902009, describes the concept of hierarchical foreign agent management in Mobile IPv6. In order to avoid data loss during handovers, the foreign agents of a mobile host buffer the data being forwarded. At handoff, the mobile host includes a handover request in its registration, and the new foreign agent requests the old foreign agent to hand over the buffered packets. To reduce duplicates, the mobile host buffers the identification and source address fields in the IP headers of the packets it receives, and these are included in the buffer handover request. The previous foreign agent then does not need to transmit those packets that were already received at the mobile host.

US 2002/0141360 A1 describes a method of soft handoff in IP-based CDMA networks by IP encapsulation. It is described that RLP PDUs can be sent to a mobile station over two paths simultaneously, where the mobile station then perform a combining into one signal. Furthermore, an IP packet filter is described for avoiding duplicate packets at a handover target base station during handovers. Namely, a target base station can receive the same IP packets from two sources during handover, on the one hand directly from the correspondent node over the network and on the other hand from the serving base station that is handing over the connection.

OBJECT OF THE INVENTION

The object of the present invention is to generally provide an improved method and system for performing, a multicast handover.

SUMMARY OF THE INVENTION

This object is solved by the subject-matter of the independent claims of the present application. Advantageous embodiments are described in the dependent claims.

In accordance with a method of the present invention, when performing a handover of a data unit based communication from a first connection between a first sender and a receiver to a second connection between a second sender and said receiver, in which multicasting is used, i.e. some of the data units destined for the receiver are provided to both the first sender and the second sender, it is proposed to indicate to the receiver a reference data unit among the multicast data units, where the receiver then keeps a record for identifying such data units among the multicast data units that where sent over the first connection (i.e. the initial connection of the handover) and successfully received.

In this way, the receiver can avoid the negative impact caused by receiving data that was duplicated on account of the handover process. For example, the receiver can simply silently discard those multicast data units that were already successfully received over the first connection.

According to a preferred embodiment, the receiver sends information to the second sender, such that the second sender is capable of identifying those data units among the multicast data units that were already successfully received over the first connection. In this way, the second sender can e.g. refrain from sending these data units over the second connection, thereby saving network resources.

BRIEF DESCRIPTION OF FIGURES

Now the present invention will be described by making reference to preferred embodiments, which are intended to be illustrative of the invention, but are in no way limiting, where the description will sometime make reference to the enclosed figures, in which.

DETAILED DESCRIPTION OF EMBODIMENTS

In the following, various embodiments of the present invention will be described. Although some of the embodiments will make reference to specific protocols (such as TCP/IP) and/or specific protocol layers (such as the link layer), the present invention is not restricted to any specific protocols or protocol layers. It can be applied in the context of any data unit based communication that is subject to a handover procedure.

It is also noted that in the context of specific protocols and technologies, subdivisions of data transported over connections receive a variety of names, such as protocol data units, frames, packets, segments, cells, etc., and that in the present application all such subdivisions of data are generically referred to as data units.

Figure 1:
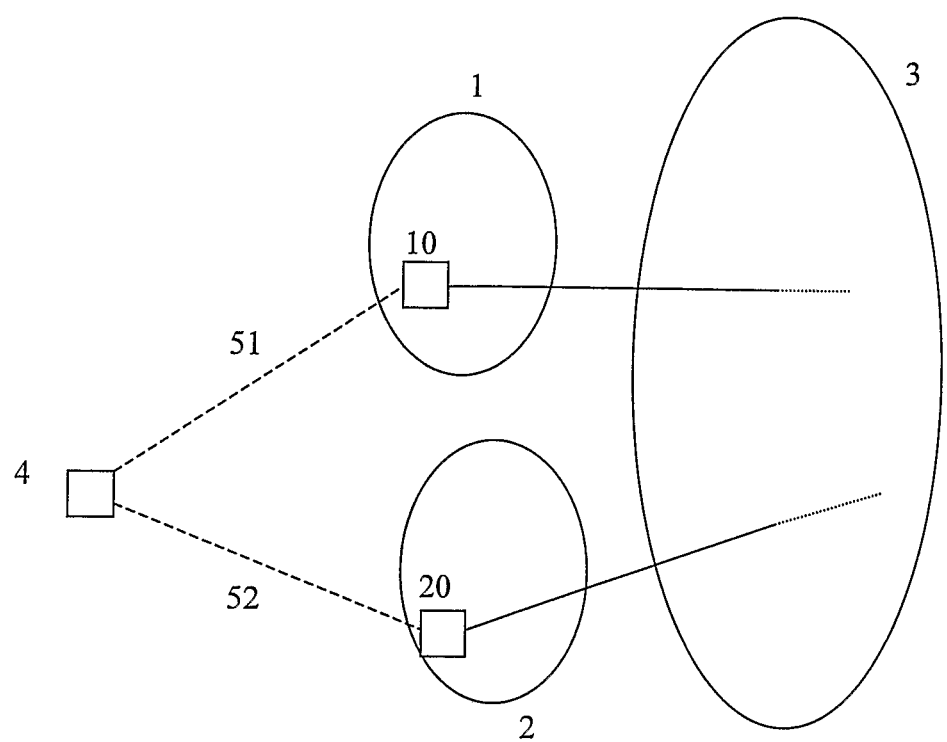
FIG. 1 shows a schematic representation of a receiver and two connections involved in a handover process.

FIG. 1 is a schematic representation of a system to which the present invention can be applied. Reference numeral 1 relates to a first access network, reference numeral 2 to a second access network, and reference numeral 3 to a communication network that is arranged to forward data units to the access networks 1 and 2. Reference numeral 4 describes a receiver capable of accessing the network 3 via access network 1 and access network 2. More specifically, access network 1 comprises a sender 10 capable of establishing a connection 51 with the receiver 4, and access network 2 comprises a sender 20 capable of establishing a connection 52 with the receiver 4. For example, receiver 4 can be a dual-mode mobile terminal that is capable of a first type connection (e.g. UMTS) via appropriate access network 1 and of a second technology (e.g. GPRS) via appropriate access network 2 to an underlying core telephone network 3. Naturally, these are only examples, and the access networks can relate to any suitable technology, and can e.g. be circuit-switched. The access networks can also be wireless LANs. Moreover, although it is preferable to employ the invention in connection with handovers between access networks of different technology, it is also possible that the access networks 1 and 2 shown in the example of FIG. 1 employ the same technology, e.g. are both WLANs.

Moreover, it is noted that although the example of FIG. 1 only shows two access networks, this is only done for the purpose of simplicity, and in general the concept of the invention can be applied to handover procedures involving any plurality of connections between a receiver and a plurality of senders in corresponding access networks. Finally, it is also pointed out that the invention can be applied to a system where the two senders between which the handover is taking place are located in one and the same access network.

The present invention is applied to a situation in which a handover of a data unit based communication from the first connection 51 to the second connection 52 is performed, and prior to discontinuing the communication over the first connection 51, data units destined for receiver 4 are provided to both the first sender and the second sender 20, i.e. a multicast (or the specific example of only having two senders, a bi-cast) handover is performed.

It is noted that the invention is in no way restricted to the relationship between the establishment of the connections 51 and 52 with the handover procedure. In other words, the invention is applicable in a case where the second connection 52 must first be established before performing the handover and the first connection 51 is terminated after the handover, but can equally well be applied to a situation where one or both of the connections 51, 52 are stationary. It is also noted that although the present invention is preferably applied to systems using wireless connections 51, 52, the invention can equally well be applied to situation where one or both of connections 51, 52 are wire-bound.

The receiver 4 is appropriately arranged to connect to access networks 1 and 2, i.e. more precisely to senders 10 and 20. It may be of such kind that it can handle the two connections 51, 52 simultaneously (also referred to as "make-before-break" in a situation where second connection 52 is established for the handover and first connection 51 is terminated after the handover), or it may be only capable of handling one connection at a time (also referred to as "break-before-make").

In accordance with the present invention, the handover procedure is such that a reference data unit among those data units provided to both the first sender 10 and the second sender 20 is indicated to the receiver 4. The reference data unit among the multicast units can e.g. be the first data unit among the multicast data units. In other words, the receiver 4 is informed of the first data unit that is provided to both the first and second sender as a part of the multicast handover, such that the receiver is capable of identifying the subsequent data units in the overall sequence being sent to receiver 4. Naturally, the reference data unit does not have to be the first multicast data unit, but can also be a predefined other data unit among the multicast data units, such as the second, third, etc.

It is noted that the indication of the reference data unit can be provided by the first sender 10, or by some other control entity responsible for the handover, e.g. a control entity in network 3. This may also depend on which entity is handling the provision of data units to both the first sender 10 and second sender 20 in the multicast handover. If the provision to both senders is performed by way of the first sender 10 simply forwarding data units to the second sender 20 (e.g. via network 3 or by means of some other connection), then it is preferable that the indication to receiver 4 is done by having the first sender 10 send a control message to receiver 4 that identifies the reference data unit.

The receiver 4 is then capable of keeping a record for identifying such data units among the multicast data units provided to both the first sender and the second sender that were sent over the first connection and successfully received by receiver 4. The record can in principle be arranged for identifying any desirable amount of data units among the multicast data units that were successfully received over the first connection 51. It is not necessary that all successfully received data units are identifiable, as e.g. the identification can be restricted to data units that were not only successfully received, but also fulfil some further desired criterion. However, it is preferable that the receiver 4 keeps a record of all data units among the multicast data units that were successfully received over the first connection 51 and are subsequent in the overall sequence of the data units to the reference data unit. In other words, if the reference data unit is e.g. the first data unit of the multicast data units, then the receiver 4 preferably keeps a record for identifying all the successfully received data units subsequent to the first data unit.

Figure 4:
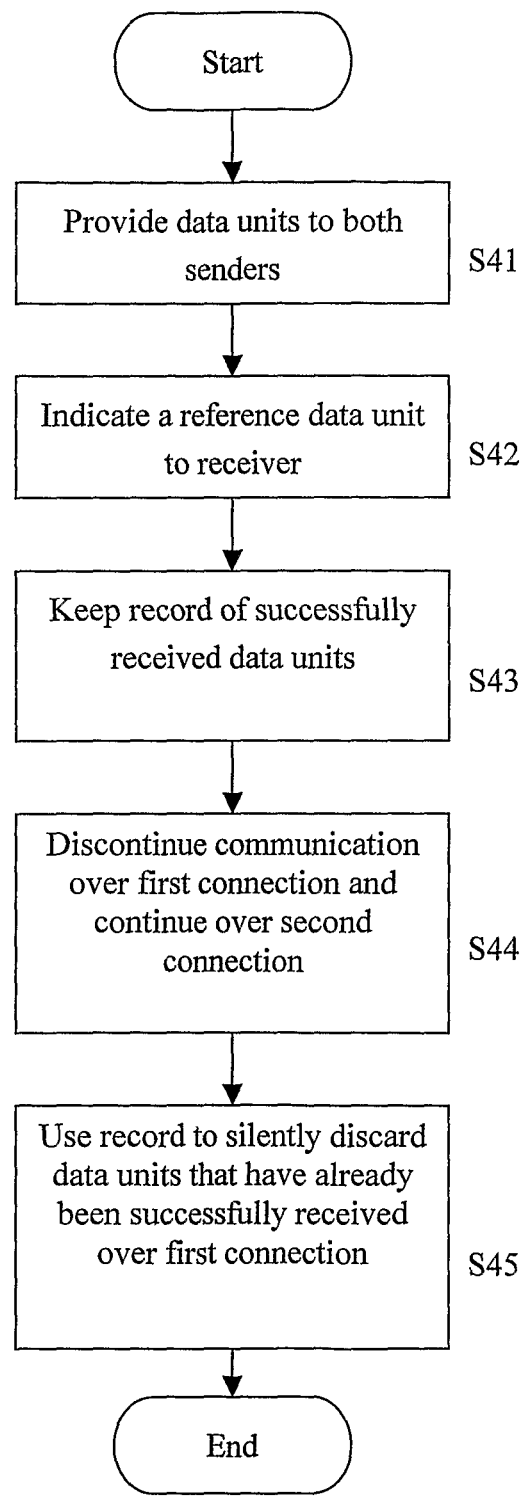
FIG. 4 shows a flow chart of a first example of the method of the present invention.

The information on identifying those multicast data units successfully received over the first connection 51 can be used in a variety of ways. This will be explained with reference to the flow chart examples shown in FIGS. 4 and 5. In FIG. 4, the method embodiment starts with step S41, in which the data units are provided to both senders, i.e. multicasting is begun. Then, in step S42, the reference data unit among the multicast data units is indicated to receiver 4, as previously described. Step S43 indicates that the receiver 4 keeps a record of the multicast data units successfully received over connection 51. Step S44 indicates the actual handover, namely that the communication is discontinued over the first connection 51 and continued over second connection 52. As a consequence, sender 20 will start sending the multicast data units previously provided to it.

As already mentioned in the introduction, if there would be no record in receiver 4 that allows to identify the data units already successfully received over connection 51, then the renewed sending of the same data units could lead to serious performance problems at higher layers. However, in accordance with the embodiment of FIG. 4, step S45 indicates that the receiver is capable of silently discarding those data units among the multicast data units that have already been successfully received over the first connection 51. As a consequence, there is no disturbance in the performance.

Figure 5:
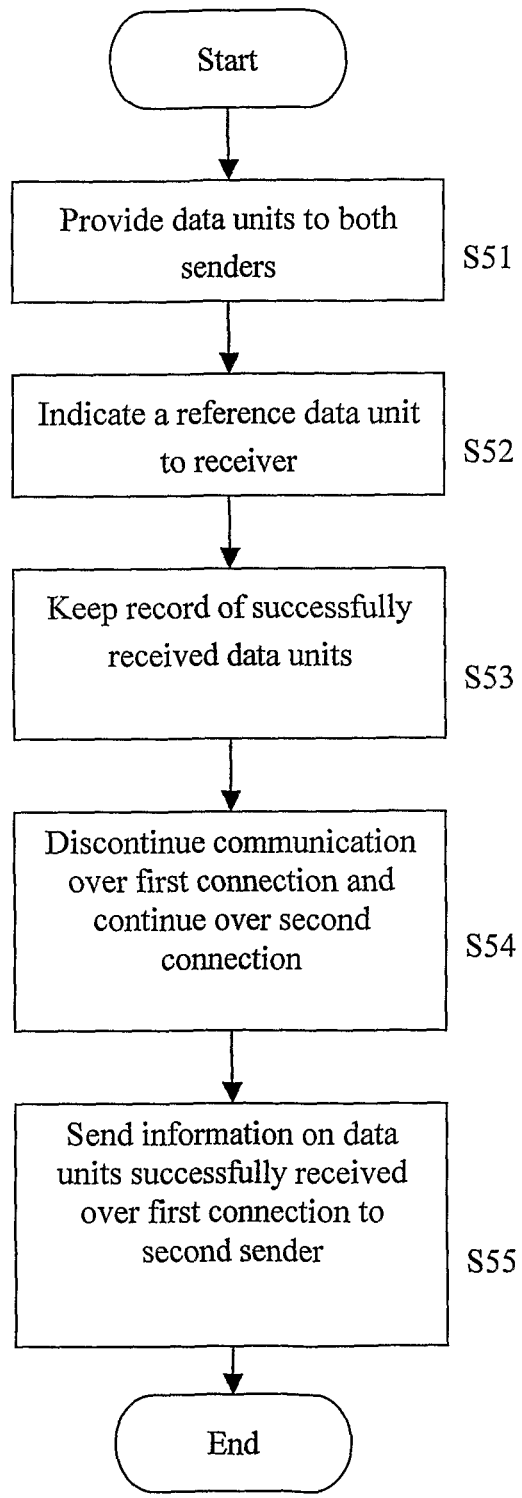
FIG. 5 shows a flow chart of a second example of the method of the present invention.

FIG. 5 shows another method example, where steps S51 to S54 are identical to previously described steps S41 to S44, respectively, such that a renewed description is not necessary. However, in accordance with the method embodiment of FIG. 5, in step S55 the receiver 4 sends information to the second sender 20 that allows the second sender 20 to identify, among the multicast data units, those data units that were successfully received by receiver 4 over the first connection 51. As a consequence, the second sender 20 can then proceed by only sending those data units to receiver 4 that were not successfully received over the first connection 51. This allows the saving of network resources, especially of wireless resources if connection 52 is a wireless connection, as the unnecessary sending of duplicate data units is eliminated. It is understandable that this additionally avoids the possible performance degradation at sender 4 due to receiving unnecessary duplicated data units.

The identification of the reference data units can be done in any suitable or desirable way. For example, it is possible to add explicit data unit identifiers to the data units, such that they can be distinguished from one another. Such identifiers can also be provided implicitly, e.g. in that each data unit carries an identification of up to which data item in an overall data amount it runs, such that this information is different in each consecutive data unit of the overall sequence.

Furthermore, the decision regarding whether a data unit was received successfully or not can be chosen in any suitable or desirable way. Preferably, a data unit is considered to have been successfully received if it is free of errors. However, it is also possible to consider a data unit with errors as having been successfully received, if the errors are within specified, tolerated limits.

The determination of a successful receipt can also be subject to further conditions. For example, if in-order delivery is required, then a data unit is considered to be successfully received only if it fulfils the above-mentioned conditions with respect to errors, and is also proper with respect to the order of the sequence. In other words, even if it is error free, but there is a data unit missing in the sequence between the just received data unit and the last successfully received data unit, then this data unit is not considered as successfully received in the event that in-order delivery is a requirement.

It is noted that the connections 51, 52 may be direct connections or that there may be further entities in between, which are not shown for simplicity. Preferably, the connections are direct connections without intervening elements. Furthermore, the connections 51, 52 preferably adhere to one protocol layer, i.e. the senders 10, 20 and the receiver 4 are peers of this protocol layer. For example, connections 51, 52 may be link layer connections that receive L3 data units, such as IP packets. The L3 data units are then received at layer L2, where they are also referred to as L2 SDUs (Service Data Units). These SDUs are segmented into L2 PDUs (Protocol Data Units). The PDUs are then sent over the respective link layer connection by the respective link layer sender 10 or 20. The receiver 4 then reconstructs the SDUs on the basis of the PDUs. The SDUs are identified by appropriate sequence identifiers, which in the following will simply be referred to as 1, 2, 3, . . . for the sake of simplicity. If the receiver 4 has received SDU number 1 without errors ("1" e.g. representing the first SDU of the multicast SDUs), then, if in-order-delivery is required, it is waited until SDU number 2 is received without error in order to judge that another SDU has been successfully received. In other words, if one of the PDUs of SDU number 2 was defective and receiver 4 is waiting for a retransmission, then even if all PDUs of SDU number 3 are received without error in the meantime, SDU number 3 is not considered successfully received until SDU number 2 has been received without error.

In the above example of in-order-delivery, the record for identifying successfully received data units can be a simple counter that counts the data units received without error (or within the error tolerance limits) and that were received in-order. The counter value provides full identification.

On the other hand, the record being kept by receiver 4 and the form in which receiver 4 possibly communicates information on the successfully received data units to the second sender 20 can be chosen in any suitable or desirable way, and will generally depend on the specific circumstances.

For example the information can also be a list of data unit identifiers that correspond to the successfully received data units. "Successful" in this case means without or with tolerable error, as explained previously. The information passed from the receiver 4 to the second sender 20 for allowing the second sender to identify the successfully received data units can then e.g. be the list itself, or the negative list e.g. all those data units missing from the list. The second sender can thereby refrain from sending data units that have already arrived successfully at the receiver, and can at the same time send those that have not.

This is applicable both for situations that require in-order delivery and such situations that do not. In the case of in-order-delivery, the receiver can then reorder received data units into the original order.

The identifiers that can be used in such lists at the receiver and/or for conveying information to the second sender can be chosen in any suitable or desirable way. The identifiers can e.g. be the protocol ID field from the header of the associated data unit, a copy of the whole header or some other part of the data unit, a copy of the whole data unit, a hash function of the header or of the entire data unit, a designated sequence number allocated to each data unit, etc.

Figure 2:
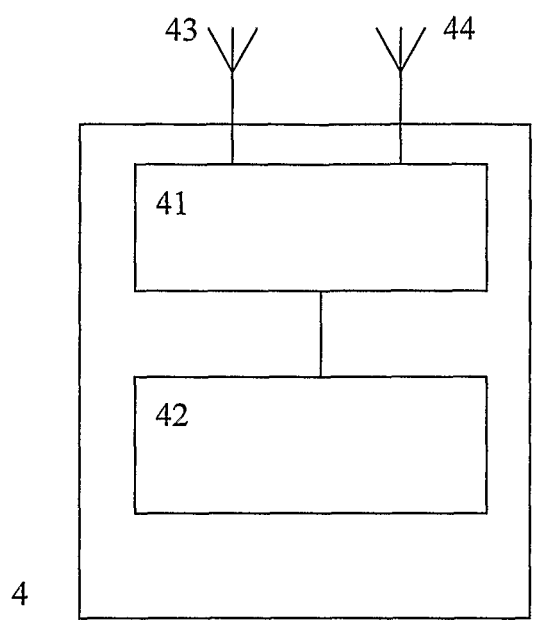
FIG. 2 schematically shows a receiver arranged to operate in accordance with the present invention.

Up to now, the invention has been described with reference to method embodiments. However, the present invention can also be embodied in the senders and the receiver previously mentioned. For example, FIG. 2 schematically shows an embodiment of the receiver 4 described above. Receiver 4 may comprise a connector 41 for providing the first connection 51 to the first sender 10 and the second connection 52 to the second sender 20. It is noted that the term "connector" is understood generically, and relates to any device capable of establishing two or more connections to appropriate data units senders. In the example shown in FIG. 2, the connector 41 has two antennas 43 and 44, which represent the possibility of connecting to a first wireless access network and a second wireless access network, respectively. Naturally, this is only an example for illustration, and the connector can comprise further antenna, or it can be appropriate to use a single antenna for accessing different wireless access networks. The connector can also have appropriate inputs and outputs for wire-line connections. Furthermore, the data unit receiver 4 may comprise a controller 42 which is arranged to control the overall function of receiver 4, and is especially arranged to control the receipt of data units over the first and second connection, to determine whether the data units were correctly received or not in accordance with the above-described principles, and for controlling the data unit receiver in a handover from the first connection 51 to the second connection 52. The controller 42 is arranged to receive the above-mentioned indication of a reference data unit among the multicast data units, and is arranged to keep the record for identifying those data units among the multicast data units that were sent over the first connection 51 and successfully received.

The controller 42 can e.g. be a programmable processor loaded with appropriate software for fulfilling the above-mentioned functions. It is noted that the receiver 4 will generally comprise further elements, such as a keyboard display, etc., depending on its functions, but these are not shown as they do not relate to the present invention.

The controller 42 is preferably arranged to count the number of data units that were successfully received over the first connection 51, in order to thereby establish the mentioned record of successfully received data units. Furthermore, the controller 42 is preferably arranged to be able to send information to the second sender 20 that allows the second sender 20 to identify, among the multicast data units, those data units that were successfully received by the receiver 4 over the first connection 51. Also, the controller 42 may be arranged to use the record that is kept, in order to silently discard data units received over the second connection 52 that were already successfully received by receiver 4 over the first connection 51.

Figure 3A:
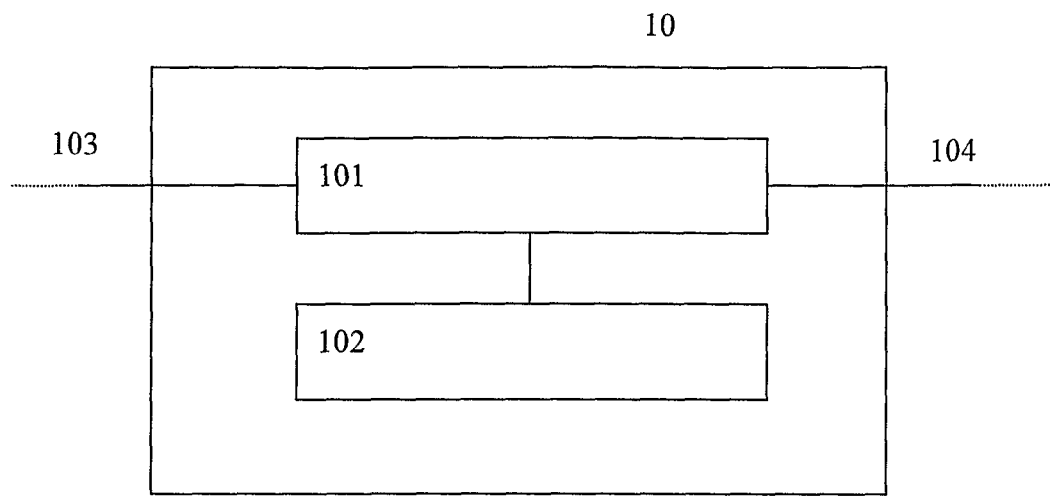
FIGS. 3a and 3b schematically show senders arranged to operate in accordance with the present invention.
Figure 3B:
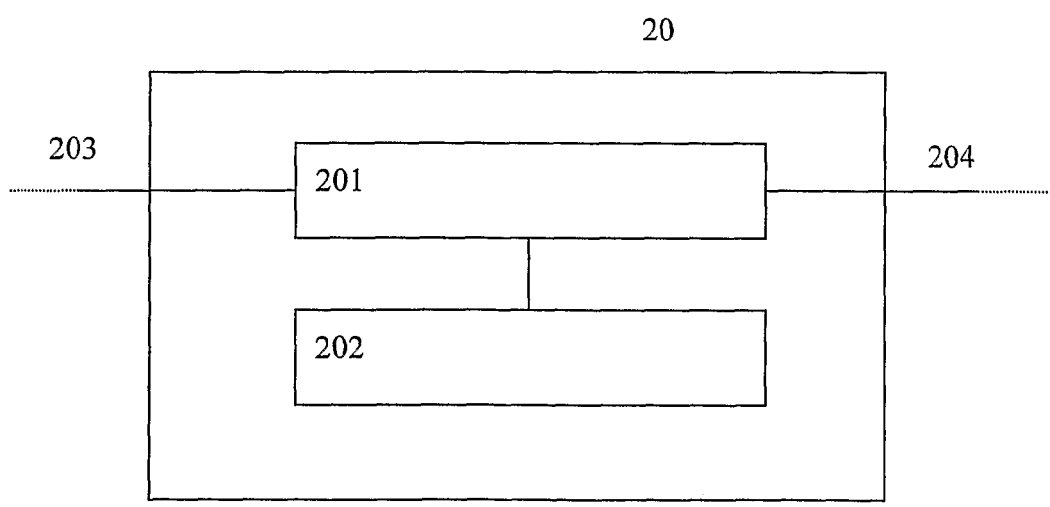

FIG. 3a shows a schematic example of a data unit sender 10 arranged in accordance with an embodiment of the present invention, and FIG. 3b shows a schematic example of a data unit sender 20 arranged in accordance with an embodiment of the present invention.

The data unit sender 10 shown in FIG. 3a comprises a connector 101 for providing the first connection 51 to receiver 4, and to the network 1 for receiving the data units to be sent to receiver 4. This is shown schematically by line 103, which indicates a part of first connection 51, and line 104, which establishes a connection to network 1. The data unit sender 10 of FIG. 3a furthermore comprises a controller 102 for controlling the data unit sender 10 in the handover from the first connection 51 to the second connection 52, where the controller is arranged to forward data units received over network 1 to the second sender 20 in the course of the handover, and to indicate to receiver 4 a reference data unit among those data units provided to both the data unit sender 10 and the other sender 20, i.e. the multicast data units.

The connector 101 is a generic element, as already explained in connection with connection 41 of receiver 4. Furthermore, the controller 102 is preferably a programmable processor running appropriate software to provide the above-mentioned functions. Also as explained in connection with FIG. 2, FIG. 3a only shows those elements important for the present invention, and other elements that the data unit sender 10 may conventionally have are not shown for simplicity.

FIG. 3b shows an example of a data unit sender 20 for sending data units to receiver 4 over the second connection 52. Similar to sender 10, sender 20 has a connector 201 for providing a connection 52 to receiver 4 and to network 2 for receiving data units. This is shown schematically by means of lines 203 and 204 respectively. Furthermore, a controller 202 is provided for controlling the data unit sender 20 in a handover from first connection 51 to second connection 52. The controller 202 is arranged to receive the above-described information from receiver 4 that allows controller 202 to identify those data units among the multicast data units that were successfully received by receiver 4 over the first connection 51.

Controller 202 is preferably arranged to only send such data units among the multicast data units to receiver 4 that were not successfully received by receiver 4 over the first connection 51 where this control operation is based upon the information received from receiver 4.

Figure 6:
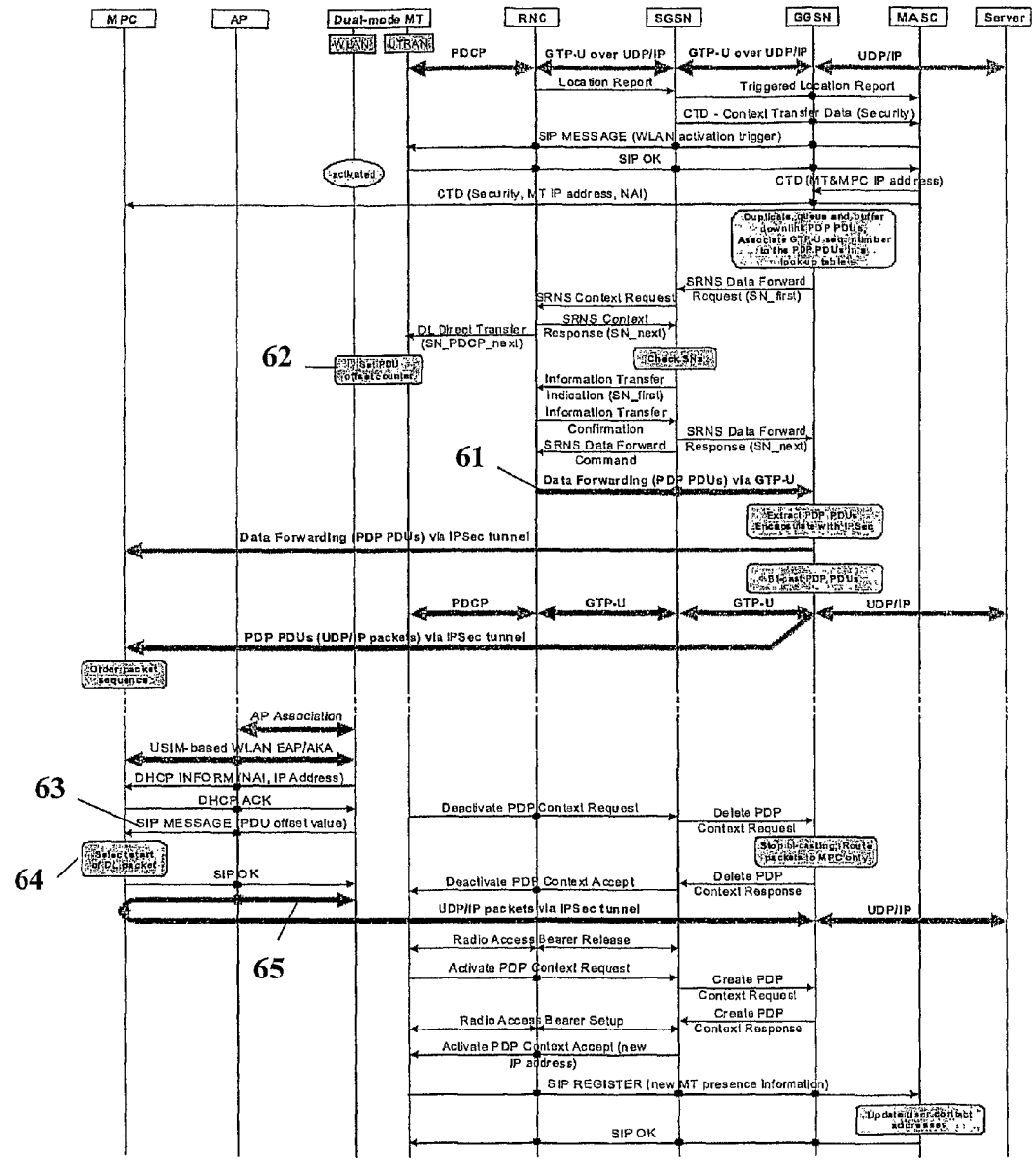
FIG. 6 shows a detailed example of the signalling and data forwarding that occurs in a handover procedure from a radio network controller to an access point of a wireless LAN, with respect to a dual-mode mobile terminal that can communicate with both the radio network controller and the wireless LAN.

Now, with reference to FIG. 6, a detailed example of an application of the present invention to a handover from a UMTS (Universal Mobile Telephone System) connection to a WLAN (Wireless Local Area Network) connection will be described. In FIG. 6, the previously described receiver is embodied by a dual-mode mobile terminal (MT). The sender 10 related to the UMTS network is embodied by a radio network controller (RNC), which communicates with a serving GPRS service node (SGSN) and a gateway GPRS service node (GGSN). The MASC (Multi-Access Service Controller) is a part of the core telephone network, and the data units (in the example of FIG. 6 IP packets) come from a server that may lie outside of the UMTS network and the WLAN network. The WLAN network is embodied by the MPC (Media Point Controller) and the access point (AP), said AP embodying the previously described second sender 20.

Many of the information exchanges and transmissions shown in FIG. 6 are of no further relevance for the subject-matter of the present invention, and shall therefore not be explained further than what is shown in FIG. 6. When a handover from UMTS to WLAN is executed, all IP packets that are stored in the RNC and have not yet been successfully transmitted are duplicated and sent via the GGSN to the WLAN AR. This is indicated by thick arrow 61 in FIG. 6. At the same time bi-casting starts at the GGSN node, where data is forwarded to the RNC and the WLAN AR. Prior to any duplication of IP packets, the mobile terminal MT is signalled to start an appropriate counter, called "PDU Offset Counter", see reference number 62. It is noted that the term "PDU" as used in the example of FIG. 6 relates to PDP (Packet Data Protocol) PDUs, e.g. IP packets. This means that they are PDUs of the higher L3 layer and could therefore also be referred to as L2 SDUs.

After the second connection via the WLAN has been established, the mobile terminal MT sends to the WLAN AR the value of the "PDU Offset Counter", see reference number 62. In the example shown at reference 63, this information is communicated via a SIP (Session Initiation Protocol) message. The WLAN AR then discards as many IP packets as indicated by the PDU offset value (see reference 64) and transmits all further IP packets, see reference 65. In this way, duplicate transmission of already received IP packets over the air interface of the WLAN, as well as the reception of duplicate packets by a higher layer protocol like TCP, can be eliminated.

It may also be pointed out that FIG. 6 gives an example where the multicast function is not implemented by one node, but by several nodes. Namely, the multicasting is done by both the GGSN and the RNC. In general, the multicast function can be performed or controlled by one designated node or by several such nodes.

Although the present invention has been described by way of preferred embodiments, these embodiments only serve to convey a clearer understanding, but are in no way intended to be limiting. Much rather, the invention is defined by the appended claims. Reference numerals in the claims serve to make the claims easier to read, but have no limiting effect.

The invention claimed is:

1. A method of performing a handover of a data unit based communication from a first connection, between a first sender and a receiver, to a second connection between a second sender and said receiver, comprising:
   sending a sequence of data units on the first connection;
   discontinuing said communication over said first connection and continuing said communication over said second connection,
   prior to discontinuing the communication over said first connection, providing data units, including a reference data unit, destined for said receiver to both said first sender and said second sender,
   indicating to said receiver, as part of the handover, the reference data unit among those provided data units provided to both said first sender and said second sender,
   said receiver, based on said reference data unit, keeping a record for identifying such data units among those data units provided to both said first sender and said second sender that were sent over said first connection and successfully received by said receiver,
   wherein said receiver uses said record to silently discard data units being received over said second connection that are among those data units provided to both said first and said second sender and that were successfully received by said receiver over said first connection.

2. The method of claim 1, said receiver keeping a record of all data units among those data units provided to both said first sender and said second sender that were successfully received over said first connection and are subsequent in said sequence to said reference data unit.

3. The method of claim 1, wherein said reference data unit is the first data unit among those data units provided to both said first sender and said second sender.

4. The method of claim 1, wherein said procedure of providing data units destined for said receiver to both said first sender and said second sender further comprises said first sender forwarding said data units to said second sender.

5. The method of claim 4, wherein said procedure of indicating to said receiver a reference data unit comprises said first sender sending to said receiver a control message for identifying said reference data unit.

6. The method of claim 1, wherein said procedure of said receiver keeping a record further comprises counting, with respect to said reference data unit, the number of data units successfully received over said first connection.

7. The method of claim 1, wherein said first sender belongs to a first wireless access network and said second sender belongs to a second wireless access network that is different from said first wireless access network.

8. A data unit receiver, comprising:
   a connector for providing a first connection, between a first sender and a receiver, and a second connection, between a second sender and said receiver, and
   a controller for controlling the receipt of data units over said first and said second connection and determining whether said data units were correctly received or not, and for controlling said data unit receiver in a handover of a data unit based communication that involves a sequence of data units from said first connection to said second connection, said handover comprising discontinuing said communication over said first connection and continuing said communication over said second connection,
   said controller
   being arranged to receive an indication of a reference data unit among said data units provided to both said first sender and said second sender in the course of said handover, and
   being arranged to keep, based on said reference data unit, a record for identifying such data units among those data units provided to both said first sender and said second sender that were sent over said first connection and successfully received by said receiver,
wherein said controller is arranged to use said record to silently discard data units received over said second connection that are among those data units provided to both said first and said second sender and that were successfully received by said receiver over said first connection.

9. The data unit receiver of claim 8, wherein said controller is arranged to count with respect to said reference data unit the number of data units successfully received over said first connection.

10. A communication system comprising:
a receiver; and
a data unit sender for sending data units to said receiver, the data unit sender comprising:
  a connector for providing a first connection to said receiver and to a network for receiving said data units, and
  a controller for controlling said data unit sender in a handover from said first connection to a second connection between a second sender and said receiver, where said handover comprises
    discontinuing said communication over said first connection and continuing said communication over said second connection, and prior to discontinuing the communication over said first connection,
    providing data units destined for said receiver to both said data unit sender and said second sender, said controller being arranged to forward said data units received over said network to said second sender in the course of said handover, and to indicate to said receiver a reference data unit among said data units provided to both said data unit sender and said second sender,
wherein said receiver is arranged to keep, based on said reference data unit, a record identifying such data units among those data units provided to both said first sender and said second sender that were sent over said first connection and successfully received by said receiver, and
wherein the receiver is arranged to use said record to silently discard data units received over said second connection that are among those data units provided to both said first and said second sender and that were successfully received by said receiver over said first connection.

* * * * *

UNITED STATES PATENT AND TRADEMARK OFFICE
CERTIFICATE OF CORRECTION

PATENT NO.         : 8,538,437 B2                                 Page 1 of 1
APPLICATION NO.    : 11/569107
DATED              : September 17, 2013
INVENTOR(S)        : Wiemann et al.

It is certified that error appears in the above-identified patent and that said Letters Patent is hereby corrected as shown below:

On the Title Page, Item (56), Under "OTHER PUBLICATIONS", in Column 2, Line 2, delete "Wirless" and insert -- Wireless --, therefor.

On Title Page 2, Item (56), Under "OTHER PUBLICATIONS", in Column 1, Line 1, delete "A:" and insert -- A, --, therefor.

On Title Page 2, Item (56), Under "OTHER PUBLICATIONS", in Column 1, Line 3, delete "et al:" and insert -- et al., --, therefor.

On Title Page 2, Item (56), Under "OTHER PUBLICATIONS", in Column 2, Line 1, delete "et al:" and insert -- et al., --, therefor.

On Title Page 2, Item (56), Under "OTHER PUBLICATIONS", in Column 2, Line 3, delete "et al:" and insert -- et al., --, therefor.

In the Specification

In Column 3, Line 22, delete "where" and insert -- were --, therefor.

In Column 6, Line 22, delete "sender 4" and insert -- sender 20 --, therefor.

Signed and Sealed this
Fifteenth Day of July, 2014

Michelle K. Lee
*Deputy Director of the United States Patent and Trademark Office*